United States Patent
Faltín et al.

(10) Patent No.: US 12,174,831 B2
(45) Date of Patent: Dec. 24, 2024

(54) SCOUTING QUERIES FOR IMPROVING QUERY PLANNING IN DISTRIBUTED ASYNCHRONOUS GRAPH QUERIES

(71) Applicant: Oracle International Corporation, Redwood Shores, CA (US)

(72) Inventors: Tomáš Faltín, Prague (CZ); Vasileios Trigonakis, Zurich (CH); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 3 days.

(21) Appl. No.: 18/073,629

(22) Filed: Dec. 2, 2022

(65) Prior Publication Data
US 2024/0184780 A1    Jun. 6, 2024

(51) Int. Cl.
G06F 16/245 (2019.01)
G06F 16/2453 (2019.01)
G06F 16/901 (2019.01)

(52) U.S. Cl.
CPC .... G06F 16/24542 (2019.01); G06F 16/9024 (2019.01)

(58) Field of Classification Search
CPC .............. G06F 16/24542; G06F 16/9024
See application file for complete search history.

(56) References Cited

U.S. PATENT DOCUMENTS

| 8,234,233 | B2 | 7/2012 | Zhou |
| 8,543,517 | B2 | 9/2013 | Shotton |
| 9,135,565 | B1 | 9/2015 | Khalefa |
| 10,140,336 | B1 * | 11/2018 | Gu .................. G06F 16/285 |
| 11,194,815 | B1 * | 12/2021 | Kumar .............. G06F 16/24552 |
| 2005/0015511 | A1 | 1/2005 | Izmailov |
| 2005/0097078 | A1 * | 5/2005 | Lohman ............ G06F 16/90335 707/E17.14 |

(Continued)

FOREIGN PATENT DOCUMENTS

EP    2743845 A1 *    6/2014    ......... G06F 16/221

OTHER PUBLICATIONS

Scout: A Framework for Querying Networks, Andrew et al (Year: 2020).*

(Continued)

*Primary Examiner* — Tarek Chbouki
(74) *Attorney, Agent, or Firm* — Hickman Becker Bingham Ledesma LLP; Stephen R. Tkacs

(57) ABSTRACT

A graph processing system is provided for executing scouting queries for improving query planning. A query planner creates a plurality of scouting queries, each scouting query in the plurality of scouting queries corresponding to a query plan for a graph query and having an associated confidence value. A graph processing system performs limited execution of the plurality of scouting queries and determines a metric value for each scouting query in the plurality of scouting queries based on execution of the scouting query. The system determines a score for each scouting query in the plurality of scouting queries based on its metric value and the confidence value of the corresponding query plan and selects a query plan based on the scores of the plurality of scouting queries. The system executes the graph query based on the selected query plan.

20 Claims, 5 Drawing Sheets

(56) References Cited

U.S. PATENT DOCUMENTS

| | | | |
|---|---|---|---|
| 2012/0109889 A1 | 5/2012 | Wu | |
| 2013/0097599 A1* | 4/2013 | Konik | G06F 16/2455 718/1 |
| 2014/0067793 A1* | 3/2014 | Shironoshita | G06F 16/24526 707/718 |
| 2014/0108414 A1* | 4/2014 | Stillerman | G06F 16/24552 707/769 |
| 2015/0193500 A1* | 7/2015 | Aute | G06F 16/24537 707/718 |
| 2015/0261817 A1 | 9/2015 | Harris | |
| 2016/0306896 A1 | 10/2016 | Paradies | |
| 2017/0091246 A1 | 3/2017 | Risvik | |
| 2017/0116271 A1* | 4/2017 | Ziauddin | G06F 16/24539 |
| 2017/0118042 A1 | 4/2017 | Bhattacharya | |
| 2018/0046675 A1* | 2/2018 | Zhou | G06F 16/24549 |
| 2018/0157978 A1* | 6/2018 | Buda | G06N 20/00 |
| 2018/0329958 A1 | 11/2018 | Choudhury | |
| 2019/0384765 A1* | 12/2019 | White | G06F 16/24545 |
| 2021/0049171 A1* | 2/2021 | Ziauddin | G06F 16/9024 |
| 2021/0089580 A1 | 3/2021 | Deng | |
| 2021/0191941 A1* | 6/2021 | Petride | G06F 16/24539 |
| 2021/0240705 A1 | 8/2021 | Trigonakis | |

OTHER PUBLICATIONS

David et al., "Asynchronized Concurrency: The Secret to Scaling Concurrent Search Data Structures", ASPLOS 2015, http://dx.doi.org/10.1145/2694344.2694359, dated Mar. 2015, 14 pages.

Labouseur et al., "The G* Graph Database: Efficiently Managing Large Distributed Dynamic Graphs", Springer Science+Business Media, Distrib Parallel Databases, DOI: 10.1007/s10619-014-7140-3, dated Mar. 2014, 36 pages.

Kim et al., "TurboFlux: a Fast Continuous Subgraph Matching System for Streaming Graph Data", SIGMOD 2018, DOI: https://doi.org/10.1145/3183713.3196917, dated Jun. 2018, 16 pages.

Khandelwal et al., "ZipG: a Memory-Efficient Graph Store for Interactive Queries", SIGMOD 2017, DOI: http://dx.doi.org/10.1145/3035918.3064012, dated May 2017, 16 pages.

Kankanamge et al., "Graphflow: an Active Graph Database", SIGMOD 2017, DOI: http://dx.doi.org/10.1145/3035918.3056445, dated May 2017, 4 pages.

Iyer et al., "ASAP: Fast, Approximate Graph Pattern Mining at Scale", Proceedings of the 13th USENIX Symposium on Operating Systems Design and Implementation, https://www.usenix.org/conference/osdi18/presentation/iyer, dated Oct. 2018, 18 pages.

Hong et al., "Pgx.D: a Fast Distributed Graph Processing Engine", High Performance Computing, Networking and Storage Conference, SC 2015, DOI: http://dx.org/10.1145/2807591.2807620, dated Nov. 2015, 12 pages.

Abdelaziz et al., "Combining Vertex-Centric Graph Processing with SPARQL for Large-Scale RDF Data Analytics", IEEE Transactions on Parallel and Distributed Systems, http://dx.doi.org/10.1109/TPDS.2017.2720174, dated 2017, 15 pages.

Dekel et al., "Cachesensitive Optimization of Immutable Graph Taversals (CS745 Project Report)", ACM, dated 2015, 9 pages.

Ma et al., "G-SQL: Fast Query Processing via Graph Exploration", Proceedings of the VLDB Endowment, vol. 9, No. 12, DOI: 2150-8097/16/08, dated 2016, 12 pages.

Dave et al., GraphFrames: an Integrated API for Mixing Graph and Relational Queries, GRADES 2016, DOI: http://dx.doi.org/10.1145/2960414.2960416, dated Jun. 2016, 8 pages.

Cong et al., "Solving Large, Irregular Graph Problems using Adaptive Work-stealing", dated 2008, 10 pages.

Chen et al., G-Minor: An Efficient Task-Oriented Graph Mining System, EuroSys 2018, Association for Computing Machinery, https://doi.org/10.1145/3190508.3190545, dated Apr. 2018, 12 pages.

Buleon, "OrientDB—The Multi-Model and Graph Database", Info-H-415: Advanced Databases, http://orientdb.com/docs/last/index.html, dated 2017, 20 pages.

Boncz et al., Breaking the Memory Wall in MonetDB, Communications of the ACM, vol. 15, No. 12, dated Dec. 2008, 9 pages.

Azure Cosmos DB, "Fast NoSQL Database with Open APIs for any Scale", https://azure.microsoft.com/en-gb/services/cosmos-db, dated 2018, 20 pages.

Dubey et al., "Weaver: a High-Performance, Transactional Graph Database Based on Refinable Timestamps", Proceedings of the VLDB Endowmwnt, vol. 9, No. 11, https://arxiv.org/pdf/1509.08443.pdf, dated 2016, 12 pages.

Shao et al., "Trinity Graph Engine and its Applications", Bulletin of the IEEE Computer Society Technical Committee on Data Engineering, https://www.graphengine.io/downloads/papers/TrinityAndApps.pdf, dated 2017, 12 pages.

Zaharia et al., "Resilient Distributed Datasets: a Fault-Tolerant Abstraction for In-Memory Cluster Computing", 9th USENIX Symposium on Networked Systems Design and Implementation, dated Apr. 2012, 14 pages.

Yan et al., "A General-Purpose Query-Centric Framework for Querying Big Graphs", Proceedings of the VLDB Endowment, vol. 9, No. 7, https://dl.acm.org/doi/abs/10.14778/2904483.2904488, dated 2016, 12 pages.

Virtuoso Universal Server, "Data-Driven Agility without Compromise", http://virtuoso.openlinksw.com, dated 2019, 10 pages.

Titan.thinkaurelius.com, Chapter 3: Getting Started, s3.thinkaurelius.com/docs/titan/1.0.0/getting-started.html, dated 2015, 8 pages.

The Linux Foundation, "JanusGraph", https://docs.janusgraph.org, dated 2020, 3 pages.

Spyropoulos et al., "Digree: Building A Distributed Graph Processing Engine out of Single-Node Graph Database Installations", SIGMOD Record—vol. 46, No. 4, https://dl.acm.org/doi/abs/10.1145/3186549.3186555, dated 2017, 6 pages.

Lumsdaine et al., "Challenges in Parallel Graph Processing", World Scientific Publishing Company, Parallel Processing Letters, dated Jan. 2007, 16 pages.

Shao et al., "Trinity: A Distributed Graph Engine on a Memory Cloud", SIGMOD 2013, https://dl.acm.org/doi/abs/10.1145/2463676.2467799, dated Jun. 2013, 12 pages.

Lyu et al., "DBL: Reachability Queries on Dynamic Graphs", Technical Report, dated Jan. 4, 2019, 27 pages.

Sarwat et al., "Horton+: a Distributed System for Processing Declarative Reachability Queries over Partitioned Graphs", Proceedings of the VLDB Endowment, vol. 6, No. 14, https://dl.acm.org/doi/abs/10.14778/2556549.2556573, dated Aug. 2013, 12 pages.

Priya et al., "A Survey on Realizing Memory-Optimized Distributed Graph Processing", IOSR Journal of Engineering (IOSRJEN), vol. 8, Issue 8 dated Aug. 2018, 7 pages.

Page et al., "The PageRank Citation Ranking: Bringing Order to the Web", http://ilpubs.stanford.edu:8090/422/1/1999-66.pdf, dated Jan. 1998, 17 pages.

Openquery.com, "OQGRAPH Engine for MariaDB", https://openquery.com.au/products/graph-engine, dated Apr. 2008, 4 pages.

Müller, "Engineering Aggregation Operators for Relational In-Memory Database Systems", Karlsruhe Institute of Technology, Germany, dated 2016, 197 pages.

Microsoft Graph Engine, "Graph Engine: Serving Big Graphs in Real-Time", https://www.graphengine.io, dated 2017, 2 pages.

Zhang et al., "REGTT: Accelerating Tree Traversals on GPUs by Exploiting Regularities", dated 2016, 10 pages.

Sharma, "Dragon: a Distributed Graph Query Engine", Facebook Engineering, https://code.fb.com/datainfrastructure/dragon-a-distributed-graph-query-engine, dated Mar. 2016, 7 pages.

Trigonakis, U.S. Appl. No. 16/778,668, filed Jan. 31, 2020, Notice of Allowance and Fees Due, Mailing Date Feb. 3, 2023.

Trigonakis, U.S. Appl. No. 16/778,668, filed Jan. 31, 2020, Non-Final Rejection, Mailing Date Oct. 1, 2021.

Trigonakis, U.S. Appl. No. 16/778,668, filed Jan. 31, 2020, Non-Final Rejection, Mailing Date Aug. 24, 2022.

Trigonakis, U.S. Appl. No. 16/778,668, filed Jan. 31, 2020, Advisory Action, Mailing Date Jun. 30, 2022.

Trigonakis, U.S. Appl. No. 16/778,668, filed Jan. 31, 2020, Final Rejection, Mailing Date Apr. 8, 2022.

* cited by examiner

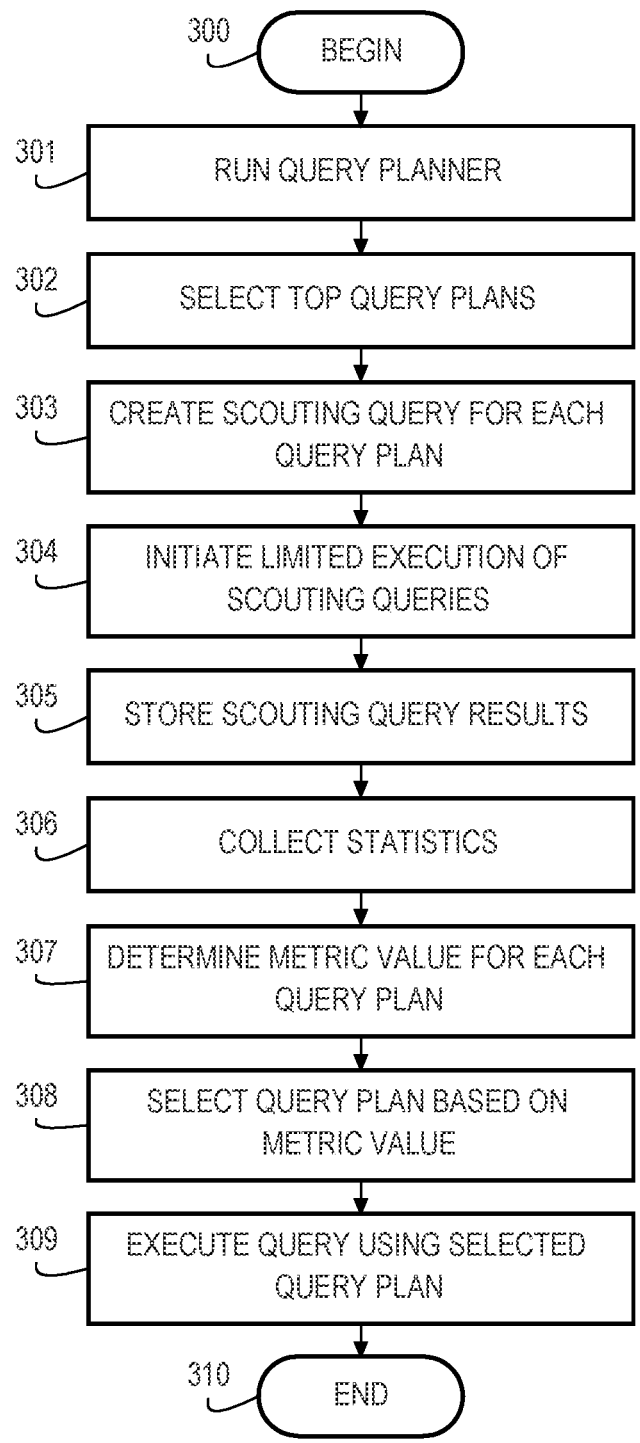

SCOUTING QUERIES FOR IMPROVING QUERY PLANNING IN DISTRIBUTED ASYNCHRONOUS GRAPH QUERIES

RELATED APPLICATIONS

This application is related to U.S. application Ser. No. 16/778,668, entitled "Dynamic Asynchronous Traversals for Distributed Graph Queries," filed Jan. 31, 2020, the entire contents of which is hereby incorporated by reference as if fully set forth herein.

FIELD OF THE INVENTION

The present invention relates to querying graph database data and, more specifically, to creating and executing scouting queries to improve query planning for distributed asynchronous graph queries.

BACKGROUND

Query planning is key for good performance of graph queries. The query plan decides the ordering of pattern matches, i.e., which vertex or edge is going to be matched first, which one second, and so on. This means that in the face of a suboptimal decision by the graph query planner, the execution is "stuck" with a bad query plan. For distributed graphs, which are expected to be typically large, this can lead to orders of magnitude worse performance. Hence, a good query plan is key for good performance of graph queries and is difficult to get right, especially for distributed graphs, because a distributed graph query engine must consider many more things compared to single-machine graph query engine. For example, a distributed graph query engine must consider partitioning of the data and messaging or communication costs. Properly modeling partitioning and the cost of networking for query planning is difficult.

The classic techniques for choosing a good query plan use graph-data statistics to compute the potential cardinality for each of the matches. Computation of the cardinality depends highly on the query. Typically, the more complex the query (e.g., long patterns and extensive filtering), the harder the computation of the cardinality for the query planner.

For example, consider a social network having two types of vertices: person and post. For purposes of explanation, Property Graph Query Language (PGQL) is used as a reference graph query language throughout this disclosure. (Additional information about PGQL can be found in "PGQL: a Property Graph Query Language", by Oskar van Rest et al., GRADES 2016, Jun. 24, 2016, the entire contents of which is incorporated by reference as if fully set forth herein.) Other graph query languages can be used depending on the implementation. There exists a connection, an edge between two vertices if the person is the creator of the post. Assume that the number of posts is much larger than the number of people. For a query that returns the number of active users, i.e., persons that created at least a single post, an example query could be the following: "SELECT COUNT (DISTINCT id(p)) FROM MATCH (person: Person)-[:Creator]->(post:Post)." There are two potential query plans, one starting with matching persons and a second starting with matching posts. The first query plan starts by matching the persons first and then, from the found vertices, continuing the matching to the posts. The cardinality of the first match is O(number_of_persons) and the potential minimal work for the whole matching is O(number_of_persons) (for each person, the edge checks whether there is an edge leading to a post—this can be done in O(1)). The second query plan starts from posts and then continues to the persons. The cardinality of the first match is O(number_of_posts) in this case. The engine follows the edges to persons; however, the minimal work needed for the matching will be O(number_of_posts). Given the assumption that the number of posts is larger than the number of persons, the first query plan starting by matching persons is more suitable for the engine according to the statistics, because the query plan results in less work.

For a query that returns a number of active users on a specific date, an example query could be the following: "SELECT COUNT (DISTINCT id(p)) FROM MATCH (p: Person)-[:Creator]->(post: Post) WHERE post:creationDate=DATE 2020-02-02." In this example, the cardinality of the matching posts with the given date cannot be known from the statistics and can be guessed with limited accuracy. Of course, date range indices could be built by the users, typically on demand, but in reality the engine cannot maintain indices for every single type and property. If the number of posts on this day is significantly lower than the total number of persons, then the query plan should start from posts and vice versa.

As previously mentioned, in distributed engines, other factors play a critical role in performance. It can be difficult to cover all metrics by statistics. For example, the partitioning of the data plays a significant role in distributed systems. In the previous example, imagine that the machine starting the matching has no local person vertices, i.e., the person vertices are stored on another machine. In that case, executing the query plan starting by matching person vertices would require messaging to another machine, which is an expensive operation in distributed environments. In those cases, it would be better to use a different query plan. Capturing all this information with statistics or analytical models is essentially intractable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 3 is a flowchart illustrating operation of a graph query processing engine for improving query planning with scouting queries in accordance with an illustrative embodiment.

DETAILED DESCRIPTION

Figure 1:
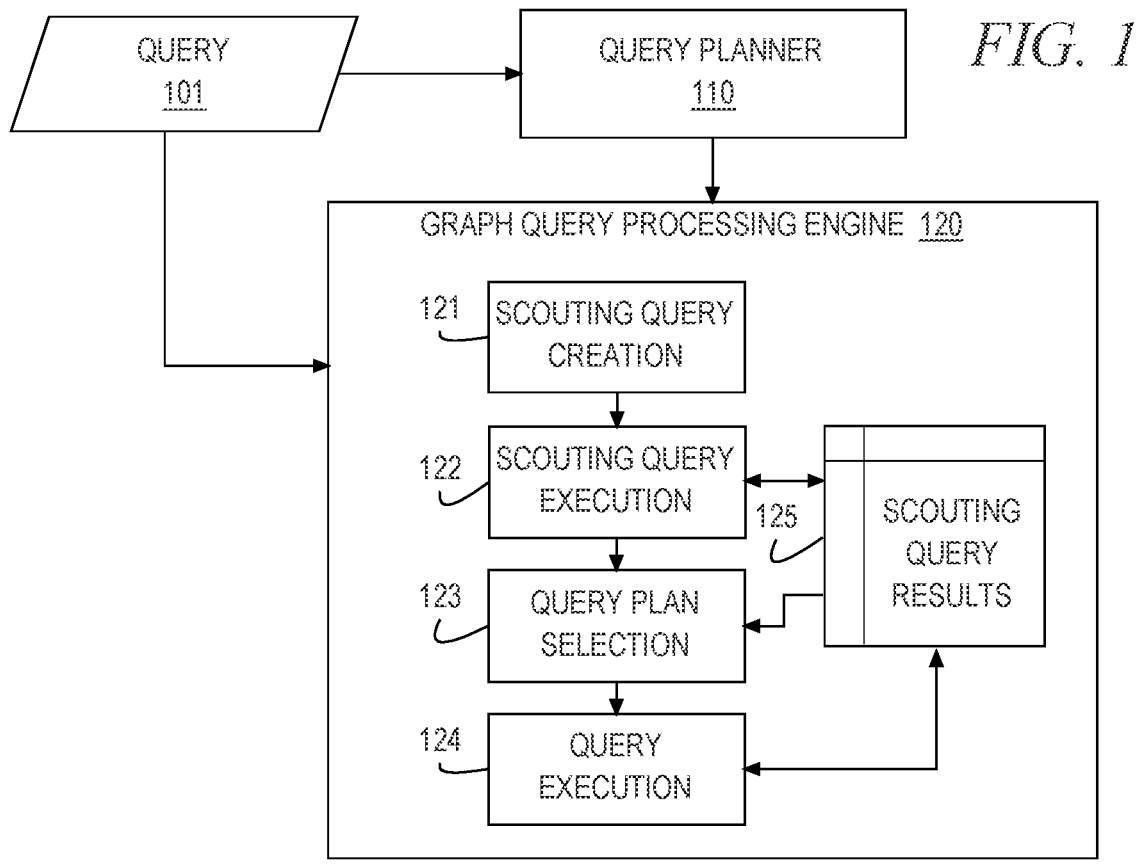
FIG. 1 is a block diagram illustrating example functional components of a graph query processing engine for improving query planning using scouting queries in accordance with an illustrative embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Query planning is very important for the performance of graph queries. Nevertheless, efficient graph query planning is difficult, especially for distributed graphs where multiple factors, such as partitioning or messaging, can play a major role in performance and are difficult to model for query planning. The illustrative embodiments described herein introduce an approach that leverages depth-first traversals in an asynchronous distributed graph query processing engine to gather information about different query plans by spawning fast scouting queries before the actual query execution. The information is later used for selecting a query plan. There is very little overhead using this approach because execution of the scouting queries is limited, and the results can be reused to avoid duplicated work.

In accordance with an illustrative embodiment, a query planner generates a set of query plans for an input query. The set of query plans can be selected by any planning algorithm, and most algorithms assign a confidence value representing how likely it is that the query plan is the optimal query plan. The graph query processing engine creates a scouting query for each query plan. A scouting query is a normal query that executes on a limited scope of the graph. In one example embodiment, execution of a scouting query is limited by canceling the query after a predetermined time as expired. In another embodiment, execution of a scouting query is limited by adding a random match filter on every element of the scouting query to randomly choose elements used for pattern matching in each step.

The scouting queries produce at least partial results of the input query. For example, if the result of input query is a set or tuples or rows, then execution of the scouting query returns some of the tuples or rows. In one embodiment, the graph query processing engine determines a metric for each scouting query based on a number of results returned per unit of time (throughput). In an embodiment, the graph query processing engine then generates a score for each query plan based on its confidence value and the throughput value of its corresponding scouting query. Thus, the graph query processing engine selects a query plan based at least in part on the number of results produced by the query plan relative to other top query plans. The selected query plan will be more likely to provide optimal performance based on actual execution results.

In accordance with the illustrative embodiments, the graph query processing engine stores scouting query results for reuse when the input query is executed. In one embodiment, for the embodiment in which scouting queries are time-limited, the graph query processing engine builds query plan groups by selecting a prefix length and grouping query plans by prefix. Query plans within the same group can share scouting query results. For reusing results, the graph query processing engine keeps track of fully traversed paths for each scouting query and ensuring that subsequent scouting queries do not repeat previously traversed paths. The graph query processing engine marks the last fully traversed path. For the embodiment in which the scouting queries are modified to add a random match filter, the graph query processing engine marks all the matched and visited paths in the graph. As a result, this approach reuses results from execution of the scouting queries, thus improving performance of executing the input query while offsetting the overhead of running the scouting queries.

Example Computing Components

FIG. 1 is a block diagram illustrating example functional components of a graph query processing engine for improving query planning using scouting queries in accordance with an illustrative embodiment. The graph query processing engine may be implemented within a graph processing system described later herein. In an embodiment, graph query processing engine 120 contains sets of instructions, services, or modules, which when executed by one or more processors perform various functions related to creating and executing scouting queries to select a query plan for an input query and to execute the input query. In FIG. 1, the graph query processing engine 120 is configured with scouting query creation service 121, a scouting query execution service 122, a query plan selection service 123, and a query execution service 124. The graph query processing engine 120 depicted in FIG. 1 represents just one illustrative example of the graph query processing engine 120 and is not intended to be limited to having only the services depicted in FIG. 1. For instance, the graph query processing engine 120 can include fewer or additional services and modules not currently shown in FIG. 1. For example, the graph query processing engine 120 can include the query planner 110. In another embodiment, the scouting query creation service 121, the scouting query execution service 122, and the query plan selection service 123 can be included in the query planner 110.

Graph queries are a very challenging workload as they put the focus on edges, i.e., the connections in the data. Therefore, executing graph queries might explore immense amounts of intermediate results, and queries can quickly explode in terms of memory usage. Additionally, queries exhibit very irregular access patterns with limited locality because the query patterns and the connections in the data dictate the accesses. In a distributed system, neither of the two main approaches to graph traversals—(a) breadth-first traversal (BFT) or (b) depth-first traversal (DFT)—are particularly suitable because of the limited locality and the large size of graphs. To solve these shortcomings, previous approaches propose mixing BFT and DFT and implement hybrid asynchronous distributed graph traversals that bring the best of both worlds, while enabling the traversals to operate within a limited configurable memory envelope. For more information about hybrid asynchronous traversals, refer to U.S. application Ser. No. 16/778,668, entitled "Dynamic Asynchronous Traversals for Distributed Graph Queries," filed Jan. 31, 2020, the entire contents of which is hereby incorporated by reference as if fully set forth herein.

As mentioned above, the performance of any graph query processing engine is highly influenced by the query plan. Query plans dictate how the pattern matching of a graph query processing engine is performed, i.e., which vertex or edge is matched first, which one second, and so on, regardless of the execution mode of the graph query processing engine. In principle, there is a set of basic match operators that any distributed query engine supports in one way or another:

vertex match: matches a single vertex inside the pattern with the given vertex filters (e.g., "SELECT COUNT (*) FROM MATCH (a)->(b) WHERE id (a)>100" has two vertex matches. Vertex (a) matches all vertices for which id is above 100 and vertex (b) matches all vertices without a filter.

outgoing edge match: matches an edge going from a given vertex with a given edge filter (e.g., "SELECT COUNT (*) FROM MATCH (a)-[e: isCreator]->(b)" has an edge match (e) that matches all edges having a label of "isCreator" and having the match (a) as the source vertex of the edge.

incoming edge match: matches an edge going to a given destination vertex with a given edge filter (e.g., "SELECT COUNT(*) FROM MATCH (a)<-[e]-(b) WHERE e.creationDate=DATE '11-07-2022'" has the edge match (e) that matches all the edges having the given property creationDate and having the match (a) as the destination vertex of the edge.

inspection match: used to transport the computation and/or data from one vertex match to another remote vertex match (i.e., a vertex that resides on another machine in a distributed system) without actually matching anything (e.g., for "SELECT COUNT(*) FROM MATCH (c)<-(a)->(b), (a)->(d)," assuming that the graph query processing engine will first execute matching in the (c)<-(a)->(b) order, it must somehow return the computation back to vertex match (a) after matching (b), as (a) and (b) might reside on different machines. If (a) and (b) are on the same machine, the inspection match turns to a no-op.

In theory, having only the vertex match, inspection match, and one edge match is enough to implement distributed pattern matching.

Every query that involves more than a single vertex match has multiple query plans. The number of potential query plans grows exponentially with number of supported matches. For example, supporting the above types of matches, a simple query counting a number of two directed hops in the graph—SELECT COUNT(*) FROM MATCH (a)->(b)->(c)—has the following query plans if the number of possible inspection matches is limited to one (=>means the inspection match): {(a)->(b)->(c), (a)->(b)=>(c)<-(b), (b)<-(a)=>(b)->(c), (b)<-(a)=>(c)<-(b), (b)->(c)=>(b)<-(a), (b)->(c)=>(a)->(b), (c)<-(b)<-(a), (c)<-(b)=>(a)->(b)}.

One can see that even for a simple query there are a lot of potential query plans. Good query plans can be preselected by traditional query planner methods, but it is difficult to select the optimal query plan, especially with the need to quantify the costs of inspection matches (and graph partitioning, which is not obvious in the graph matching operators). A traditional graph query planner assigns a cost to each of the query plans. The cost of a query plan (QP) "cost(QP)= X" means that the given query plan "costs" X arbitrary units of computation. A traditional query planner assigns cost based on cardinality of each of the query matches. A simplest query planner can assign one unit per traversed element, edge, or vertex with all matches having the same cost equal to 1.

For example, having a graph G with 1,000 vertices and 100,000 edges, query plan A: "(a)-[e]->(b) WHERE id(a)>0 AND id (a)<10" has cost(A)=10 (match vertex a)*100,000 (match edge e)*1,000 (match vertex b)=1,000,000 units. Of course, different query planners can quantify different aspects of the query plan, such as having different costs for different operators, etc. Choosing the optimal query plan based on the cost-based analysis is a well-explored topic and is outside the scope of the present disclosure. The approach of the illustrative embodiments builds directly on top of the traditional query planning approaches. The illustrative embodiments can potentially solve the problem of choosing an optimal query plan by actually executing the top query plans with distributed asynchronous DFT and selecting the query plan that works best in practice.

Query Planning

Query planner 110 selects a set of query plans for an input query 101 and provides the set of query plans to graph query processing engine 120. In one embodiment, the query planner 110 selects the set of query plans to include the top N query plans according to cost or confidence value. The top query plans can be selected by any planning algorithm, and most algorithms assign a confidence value representing how likely it is that the query plan is the optimal query plan. The confidence can be used later for preselecting the top N query plans and can be used in a later step for selecting the optimal query plan, as will be described in further detail below. In an example embodiment, the query planner 110 selects a predetermined number N of query plans. In another example embodiment, the query planner 110 ranks the query plans by confidence value and selects the top ranked query plans until a predetermined percentage of confidence is covered.

Scouting Query Creation and Execution

Scouting query creation service 121 creates a scouting query for each query plan in the set of query plans received from the query planner 110. Scouting queries are normal queries that run fast (e.g., in the order of milliseconds) on a limited scope of the graph. The scouting queries are used to collect some characteristics used for choosing one of the preselected query plans—the query plan that performs the best. In order to collect statistics along the whole matching path, it is important for scouting queries to be DFT-based. BFT engines collect all intermediate results per each match and then proceed to the subsequent match. In order to get into the match M, the scouting queries must match and collect results for all previous matches, M−1, M−2, . . . , 1. On the other hand, DFT engines pick up only a single result (V) per match M to proceed to the subsequent matches M+1, M+2, . . . and return back to the next result (V+1) of match M once it traverses the whole subtree of the results (V). In other words, DFT engines produce final results eagerly, which enables scouting queries to quickly figure out which query plans run to completion faster than others.

Figure 2:
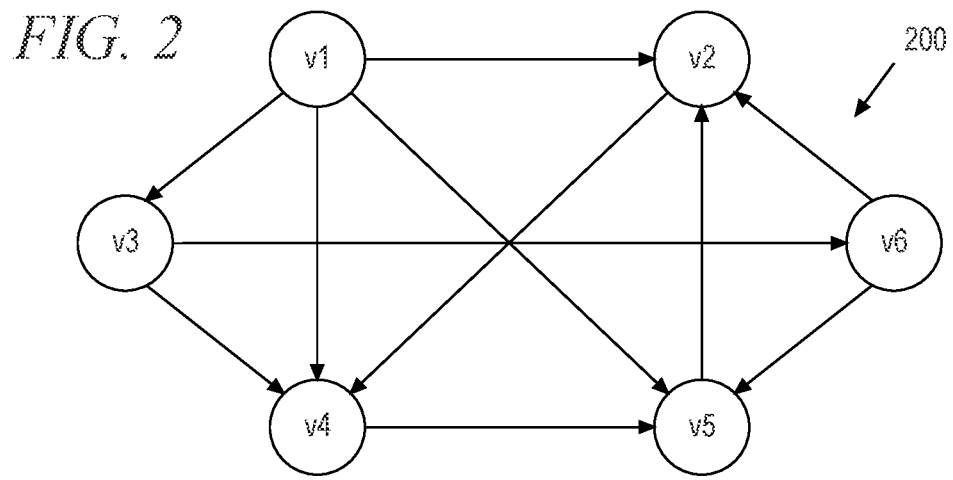
FIG. 2 illustrates an example graph on which a graph query can be executed in accordance with an illustrative embodiment.

FIG. 2 illustrates an example graph on which a graph query can be executed in accordance with an illustrative embodiment. Consider the query, "SELECT COUNT(*) FROM MATCH (a)->(b)->(c)." Executing the query on graph 200, BFT first matches a match (a) as R1={v1, v2, v3, v4, v5, v6}. The result of second step (matching (a)->(b)) is as follows R2={v1->v3, v1->v4, v1->v5, v2->v4, v3->v4, v3->v6, v4->v5, v5->v2, v6->v2}. The results of the final step (matching (b)->(c) are R3={v1->v3->v4, v1->v3->v6, v1->v4->v5, v1->v5->v2, v2->v4->v5, v3->v4->v5, v3->v6->v2, v4->v5->v2, v5->v2->v4, v6->v2->v4}. Notice that to get at least a single match/result from R3, the query must match all intermediate results of R2. Without matching at least one result from R3, the query planner will not have statistics for the last match (b)->(c), which leads to a suboptimal decision.

Now consider a depth-first traversal on the same graph 200 and the same query above. DFT first matches R1={v1}, continues to R2={v1->v2}, and R3={v1->v2->v4}, which is the final result. After returning the final result, DFT continues by "going back" to (v2), which has no other neighbors. Thus, DFT continues back to (v1) and starts the search over again, i.e., matching R4={v1->v3} and R5={v1->v3->v4}, going back to (v3) and matching the result of neighbor R6={v1->v3->v6}, and so on.

Notice the large difference in number of intermediate results for a single result between BFT and DFT, even on a small graph. To collect characteristics from a small number of matches, scouting query execution service 122 uses DFT approach to execute the scouting queries; otherwise, the explosion of intermediate state implies a poor performance of the scouting query.

The scouting queries must run almost instantly compared to the execution of the query 101 to not slow down the overall execution of query 101 (when a bad query plan executes). On the other hand, scouting queries should have enough time to explore all the matches along the pattern, as shown in the previous example. Ideally, the time limit should be configured for each scouting query based on the expected performance of the graph query processing engine. For example, if the graph query processing engine can deliver 1,000,000 results in 20 ms, running the scouting query for a few milliseconds should be enough for almost any query. In most realistic scenarios, an execution of approximately 50 ms should given enough information to the query plan selection service 123. The scouting query execution service 122 must account for the overhead of starting the query, which should not be too high, because the overhead is encountered for every scouting query. Given this fact, scouting queries are most effective for large graphs and/or large queries.

It is important for the scouting queries to find some final (output) results 125 if that is possible. The number of returned results per unit of time, i.e., throughput, can be used as an indication of the performance of the scouting query, and in turn its query plan. If the query plan A returns more results than query plan B in the same amount of time, with a high probability query plan A is better than query plan B. Having more results does not always mean a better query plan, as the engine might be "lucky" while executing a worse query plan. Consider a query, "SELECT COUNT(*) FROM MATCH (a)->(b) WHERE id(a)<10," where the best query plan starts from matching (a) because of the limited filtering (assuming all identifiers are greater than zero) and continues to the matching of (b). In some extreme cases, the other bad query plan starting by matching (b) can have a higher or equal throughput during scouting, e.g., it matches (b) and follows to (a) with id (a)=1, 2, 3, 4, 5.

To eliminate the extreme cases, the query plan selection service 123 considers the confidence of the query plan in addition to the throughput. In an embodiment, the query planner 110 provides a confidence value for each of the preselected query plans. If that is not the case, then the query plan selection service 123 treats all query plans as equal. The formula for selecting the optimal query plan may be as follows: argmax(confidence(QP)*(throughput(QP)+1). Of course, depending on the graph query processing engine and the query planner, other policies for weighting metrics for query plan selection can be devised within the spirit and scope of the illustrative embodiments.

Consider the query, "SELECT COUNT(*) FROM MATCH (a)->(b) WHERE id(a)<10," as an example. Consider the query planner 110 returns two query plans: query plan A (a)->(b) with confidence 0.95 and query plan B (b)<-(a) with confidence 0.05. The scouting plan execution service 122 runs scouting queries for both query plans and gets 100 matches for query plan A and 2 matches for query plan B. According to the formula above, the query plan selection service 123 calculates a score of 0.95*101=95.95 for query plan A and a score of 0.05*3=0.15 for query plan B, which results in selection of query plan A. Even if the scouting query for the lower confidence query plan generating more results than the scouting query for the higher confidence query plan, it is unlikely to be chosen because of its confidence score.

There may be queries that generate a small number of results or no results, which can imply throughput of zero for all scouting queries. To solve that issue, in one embodiment, the query plan selection service 123 uses a second metric. The scouting query execution service 122 tracks a number of visited vertices for each vertex match. The plan with the smallest product of those numbers is the chosen query plan. This metric prefers small number of vertex matches at the beginning compared to a small number of matches at the end of the query plan.

The benefit of the illustrative embodiments is that any statistic/metric for choosing the best query plan can be used while running the scouting queries. The above-mentioned metric optimizes for the graph query processing engine performance. One can easily create a metric that aims for a different optimization metric, e.g., when the engine is low on memory, it can prefer memory consumption over performance. In that case, while executing a scouting query, the engine can monitor the memory consumption and select the query plan with the lowest memory consumption. Another policy important in cloud environments is the policy for minimizing the overall engine cost. To minimize the cost for the query execution, the engine can monitor usage of different modules (at their cost) during scouting query execution and select the query plan with the potentially lowest cost for the user.

Every scouting query must start execution at a single graph vertex. If the graph vertex is selected by the query plan, e.g., "QP=(a)->(b)->(c) WHERE id(a)=0," the scouting query execution service 122 uses that specific vertex for beginning depth-first traversal. If there are multiple choices for the starting vertex, e.g., "QP=(a)->(b)->(c)," the scouting query execution service 122 selects the starting vertex randomly. By choosing the vertex randomly, the collected statistics are more representative compared to incrementally starting vertex selection. In combination with query plan prefix groups (explained later below), the scouting query execution service 122 selects the vertex according to group rules so the results 125 can be reused, and the work of the scouting query is not duplicated. In other words, every scouting query within the same group must start from a different random starting vertex.

The execution of the scouting queries is up to the scouting query execution service 122. As mentioned above, for the queries to be fast, the execution of the queries must be limited. One way is to limit the execution time of the queries by the engine. To support this, the engine needs efficient support for cancellation. Using query cancellation, the scouting query execution service 122 executes each of the scouting queries for a given amount of time and then stop the query. For more information about implementation of query cancellation, refer to U.S. application Ser. No. 17/750,339, entitled "Concurrency and Cancellation in Distributed Asynchronous Graph Processing," filed May 21, 2022, the entire contents of which is hereby incorporated by reference as if fully set forth herein.

Another approach is to limit the parts of the graph that are traversed. Vertex and edge matches do not traverse all potential elements, but the engine randomly chooses elements used for pattern matching in each step. In this case, the scouting queries are doing a random walk with the given query on the searched graph. This can be implemented by adding a random match filter in a WHERE clause on every element of the scouting query. For example, the query, "SELECT COUNT(*) FROM MATCH (a)-[e]->(b)-[f]->(c)," is transformed to the modified query, "SELECT COUNT(*) FROM MATCH (a)-[e]->(b)-[f]->(c) WHERE rand_bool(a, X) AND rand_bool(e, X) AND rand_bool(b, X) AND rand_bool(f, X) AND rand_bool(c, X)," where rand_bool(element, X) is a function that returns a logical TRUE for the given element with the given X % probability, i.e., rand_bool(a, 40) returns TRUE in 40% of the calls and FALSE in 60% of the calls to the functions. Note that rand_bool(element, X) is not a standard PGQL function. This approach is not as clean or effective as the time-capped approach above but could be used to deploy scouting queries in BFT-based engines, which have no control of pushing output results out eagerly.

While monitoring the number of matches for each vertex match, the scouting query execution service 122 may notice that a given scouting query has already traversed a significant amount of the graph. In this case, the scouting query execution service 122 can give up execution of other queries and let the given scouting query run with a potentially worse query plan. To minimize the potential of running the worse query plan, the scouting query execution service 122 runs the scouting queries in descending order of the confidence of the corresponding query plans. For instance, if there are three query plans—QP_A with confidence 0.60, QP_B with confidence 0.30, and QP_C with confidence 0.80, then the execution order would be QP_C, QP_A, QP_B. The scouting query execution service 122 executes the scouting query for QP_C first, which finishes with 100 results and traverses 3% of the vertices. Then the scouting query execution service 122 executes the scouting query for QP_A, which finishes with 200 results and traverses 90% of the vertices. Because 90% is above a set threshold, the graph query processing engine 120 allows QP_A to finish the computation. The graph query processing engine 122 does not continue with the QB_B scouting query because the time spent on running the QP_B scouting query is likely to be larger than finishing the QP_A scouting query with potentially fewer results.

Additionally, if the predicted amount of remaining time after a scouting query is less than time_limit_per_scouting_query*num_remaining_scouting_queries, then the scouting query execution service 122 may allow the query to finish even with a potentially worse query plan. For example, if the time limit for running a scouting query is set to 10 ms, there are five scouting queries, and the first scouting query SC1 traverses 40% of the graph in that time, then there is the assumption that the query will continue with a similar pace of matching. Therefore, the scouting query SC1 may finish in another 10-20 ms in comparison to running the left four scouting queries in 4*10 ms=40 ms. Thus, it is better to let the first scouting query SC1 finish.

The execution is influenced by multiple variables; therefore, the graph query processing engine 120 must ensure that the computing environment for running all the scouting queries is the same (as is done for benchmarking). Ideally, the graph query processing engine 120 may use the same computing environment that would be used by the query execution service 124 for executing query 101 to get an idea of the expected performance. If that is not possible, the graph query processing engine 120 attempts to use the same environment for all scouting queries. The returned results might be a bit different, but they still should reflect the overall performance of the query plans.

If the graph query processing engine 120 cannot achieve the same environment for running all the scouting queries, then the query plan selection service 123 can normalize the results to compare the returned results 125. For example, consider the system is under a heavy load from running different queries in parallel from different users. The scouting query execution service 122 runs scouting query SC1 for 100 ms with only 4 threads returning 100 results and runs scouting query SC2 for 100 ms with 8 threads returning 100 results. Given the other environment variables were more or less the same, by normalizing to the same number of threads, the performance of SC1 is 100 ms per 4 threads (25 results per thread), and the performance of SC2 is 100 ms per 8 threads (12.5 results per thread) for the same unit of time. Based on that, the query plan selection service 123 selects the query plan associated with scouting query SC1. The normalization of results 125 must be tuned based on the engine and the environment where it runs. Also, the approach of the illustrative embodiments is still probabilistic and does not guarantee to select the best query plan.

Reusing Results

One potential overhead of scouting queries is when throwing away perfectly correct computed query matches. The illustrative embodiments solve this issue by introducing scouting query results reuse. All query plans must return the same results, but they can differ in the order that intermediate results are expanded to generate final results. DFT engines return results eagerly compared to BFT. DFT engines systematically explore all matching subtrees with the same prefix and, once they move to another prefix, there are no more results with that same prefix.

The graph query processing engine 120 uses this observation for building query plan groups. If two query plans have the same matching prefix, then they belong to the same group. For instance, if the graph query processing engine sets the prefix length to one (i.e., group query plans that start with the same vertex match) for the above query example, "SELECT COUNT(*) FROM MATCH (a)->(b)->(c)," the following groupings of query plans result:

a group starting with the vertex match (a): (a)->(b)->(c), (a)->(b)=>(c)<-(b)

a group starting with the vertex match (b): (b)<-(a)=>(b)->(c), (b)<-(a)=>(c)<-(b), (b)->(c)=>(b)<-(a), (b)->(c)=>(a)->(b)

a group starting with the vertex match (c): (c)<-(b)<-(a), (c)<-(b)=>(a)->(b)

The query plans within the same group can directly share scouting query results 125, and the query execution service 124 executes query 101 based on the selected optimal query plan using scouting query results 125. The results 125 can be shared if a query traverses a whole subtree for the given matches prefix. For example, for the query, "SELECT COUNT(*) FROM MATCH (a)->(b)->(c)," and matched prefix (a=1)->(b=2), it means traversing and trying to match starting from root vertex (2). Thanks to DFT, there are no further matches after traversing the whole subtree and that portion of the graph with the same prefix (a=1)->(b=2) must not be visited again.

For reusing the results, the graph query processing engine 120 splits the query plans into query plan groups according to a prefix. The length of the prefix can be set statically or dynamically after analyzing the top N query plans. Because the graph query processing engine will reuse results of scouting queries from the same group, it must remember which matched prefixes were fully traversed and the results for the fully traversed prefixes in scouting query results 125. After running the next scouting query from the same group, the scouting query execution service 122 avoids prefixes that were fully traversed to not duplicate the same work. After finishing all scouting queries from the group, the scouting query execution service 122 produces a set of traversed prefixes and their results 125.

After the query plan selection service 123 selects the optimal query plan, the query execution service 124 can easily continue computation of query 101 from the non-visited or matched paths. The final output is a union of results from the executed query 101 and all partial results 125 collected during execution of the scouting queries. Even when each group contains a single query plan, the results collected from the scouting query can be reused.

For instance, take the group starting with the vertex match (a). Consider (a)->(b)->(c) returns 120 results and fully matches the patterns with (a) equal to a=1, 2, 3, 4, 5 and partially finishes a=6. The partially completed results are ignored, but the pattern (a)->(b)->(c) for a=<1 . . . 5> has 120 results. The confidence for this query plan may be 0.65, so the overall score for this query plan is 121*0.65=78.65. Then, the scouting query (a)->(b)=>(c)<-(b) is executed with confidence 0.35, which finishes for a=6, 7, 8 with 100 results. The overall score for this query plan is 101*0.35=35.35. Based on the scores, the graph query processing engine uses the query plan (a)->(b)->(c) but starts matching from a>8 and returns 10,000 results. The final result is the union of all the results, i.e., 10,000+120+100=10,220.

In an alternative embodiment, to avoid duplicated work, the graph query engine marks all the matched and visited paths in the graph and stores results for each of time. Using the previous example, for the first query plan, the graph query engine marks matches <1,2,3>, <1,2,4>, <1,2,5>, <2,7,8>, <3,4,5>, <4,1,2>, <5,6,7>, <5,7,9> with an identifier and stores the results for those matches on the side. This approach is very time consuming; however, compared to the above prefix approach, it can be used together with random walk scouting queries or potentially other approaches.

It is worth noting that not only are matched results reused, but the graph query processing engine avoids traversing paths that proved to be dead ends, i.e., do not produce a match due to not satisfying query filters or do not match the graph pattern. Thus, the illustrative embodiments improve performance by avoiding repeated work whether the work generated results or not.

Procedural Overview

FIG. 3 is a flowchart illustrating operation of a graph query processing engine for improving query planning with scouting queries in accordance with an illustrative embodiment. Operation begins (block 300), and the graph query processing engine runs a query planner to create a set of query plans for an input query (block 301). In an example embodiment, the query planner provides a confidence value for each query plan. The graph query planning engine selects a subset of the top query plans (block 302). The graph query planning engine then creates a scouting query for each query plan in the selected subset of the top query plans (block 303).

The graph query processing engine initiates limited execution of the scouting queries (block 304) and stores scouting query results (block 305). In one example embodiment, execution of a scouting query is limited by canceling the query after a predetermined time as expired. In another embodiment, execution of a scouting query is limited by adding a random match filter on every element of the scouting query to randomly choose elements used for pattern matching in each step. In some embodiments, the scouting queries are executed such that the visited paths are tracked, and subsequent scouting queries do not repeat paths that were fully visited.

The graph query processing engine collects statistics from the execution of the scouting queries (block 306). In one embodiment, the statistics can include a throughput value based on a number of results returned by the scouting queries. In another example, the statistics can include a number of vertices visited by the scouting queries. In one embodiment, the graph query processing engine normalizes the statistics based on the environment in which scouting queries are executed (e.g., number of threads). The graph query processing engine then determines a metric value or score for each query plan based on the statistics of the scouting queries (block 307). In one embodiment, the score for a query plan is based on a throughput value of the scouting query and the confidence value of the query plan.

The graph query processing engine selects a query plan based on the metric value or score (block 308). The graph query processing engine executes the input query using the selected query plan (block 309). In one embodiment, the input query is executed such that paths that were visited in the execution of the scouting queries are not repeated by the execution of the input query using the selected query plan. The results from the execution of the input query using the selected query plan can be combined with the results from executing the scouting queries to generate final results. Thereafter, operation ends (block 310).

Figure 4A:
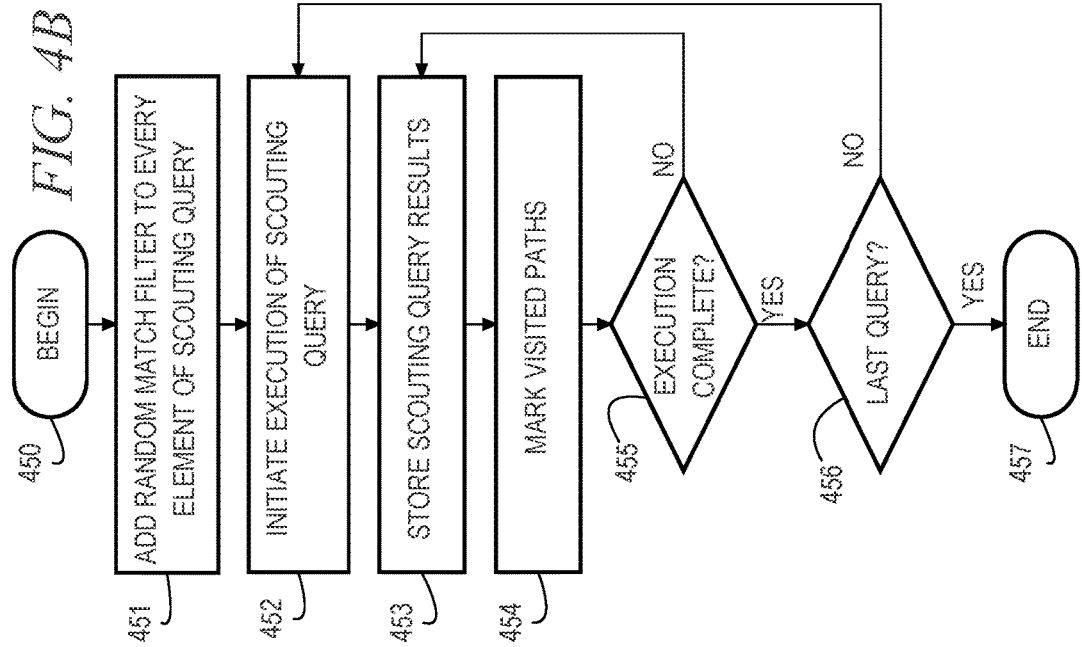
FIG. 4A is a flowchart illustrating operation of a graph query processing engine for time-limited execution of scouting queries in accordance with an illustrative embodiment.

FIG. 4A is a flowchart illustrating operation of a graph query processing engine for time-limited execution of scouting queries in accordance with an illustrative embodiment. Operation begins (block 400), and the graph query processing engine splits the query plans into groups based on a prefix (block 401). The grouping of the query plans allows the scouting queries to share scouting query results within the same group. The graph query processing engine then initiates execution of a first scouting query in a first group (block 402) and stores scouting query results (block 403). The graph query processing engine determines whether a timer expires (block 404). If the timer does not expire (block 404: NO), then execution of the scouting query continues, and operation returns to block 403 to store scouting query results.

If the timer expires (block 404: YES), then the graph query processing engine stops execution of the scouting query (block 405). The graph query processing engine records a last visited vertex (block 406). Results for fully visited paths can be reused, and results for partially visited paths can be discarded or ignored. The graph query processing engine then determines whether the scouting query is a last query (block 407). If the scouting query is not the last query (block 407: NO), then operation returns to block 402 to initiate execution of the next scouting query. This can be the next scouting query in the same group, in which case execution of the next scouting query can reuse results of matched vertices from previous scouting queries, or a first scouting query in the next group. Furthermore, the next scouting query can be executed such that fully visited paths are avoided to ensure subsequent scouting queries do not duplicate work.

If the scouting query is the last scouting query (block 407: YES), then operation ends (block 408). The results of the scouting queries can then be reused when the input query is executed using the selected query plan.

Figure 4B:
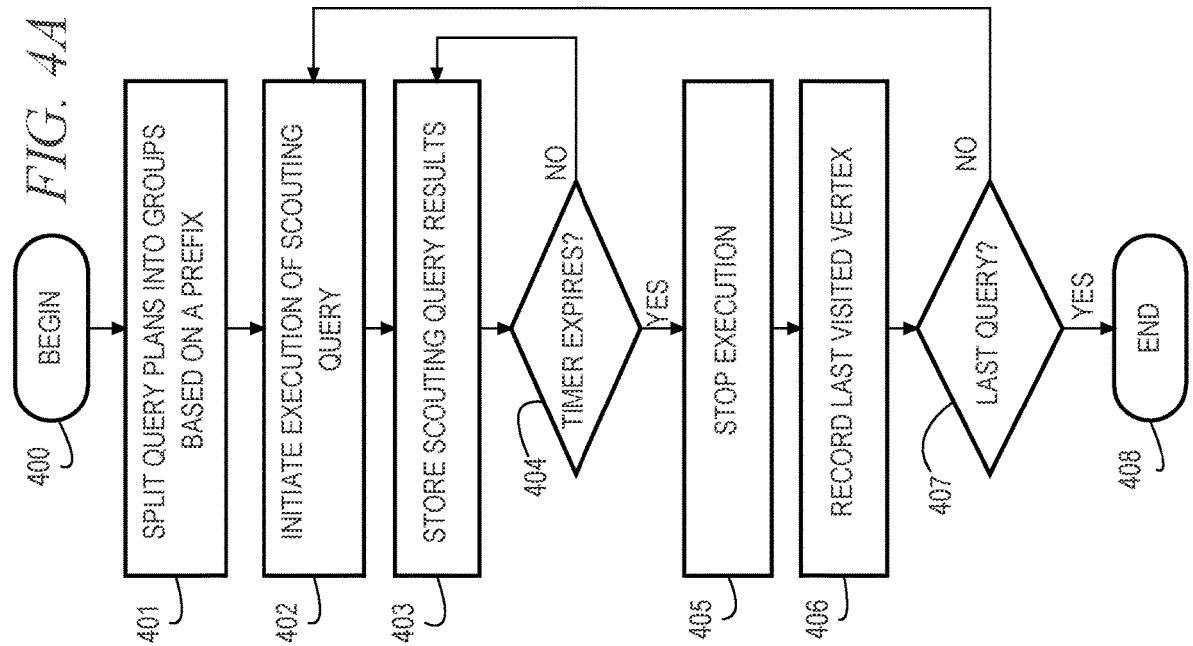
FIG. 4B is a flowchart illustrating operation of a graph query processing engine for random-walk execution of scouting queries in accordance with an illustrative embodiment.

FIG. 4B is a flowchart illustrating operation of a graph query processing engine for random-walk execution of scouting queries in accordance with an illustrative embodiment. Operation begins (block 450), and the graph query processing engine adds a random match filter to every element of each scouting query (block 451). This approach limits the portions of the graph that are traversed while ensuring an even distribution of traversals in the graph. The number or percentage of vertices and edges visited by the scouting query can be controlled by the variables in the random match filters. The graph query processing engine initiates execution of the scouting query (block 452) and stores scouting query results (block 453). The graph query processing engine also marks visited paths (block 454) to ensure subsequent scouting queries do not duplicate work.

The graph query processing engine determines whether execution of the scouting query is complete (block 455). If the scouting query is not finished (block 455: NO), then execution of the scouting query continues, and operation returns to block 453 to store scouting query results and mark visited paths. If execution of the scouting query is complete (block 455: YES), then the graph query processing engine determines whether the scouting query is a last query (block 456). If the scouting query is not the last query (block 456: NO), then operation returns to block 452 to initiate execution of the next scouting query. The next scouting query can be executed such that fully visited paths are avoided to ensure subsequent scouting queries do not duplicate work.

If the scouting query is the last scouting query (block 456: YES), then operation ends (block 457). The results of the scouting queries can then be reused when the input query is executed using the selected query plan.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
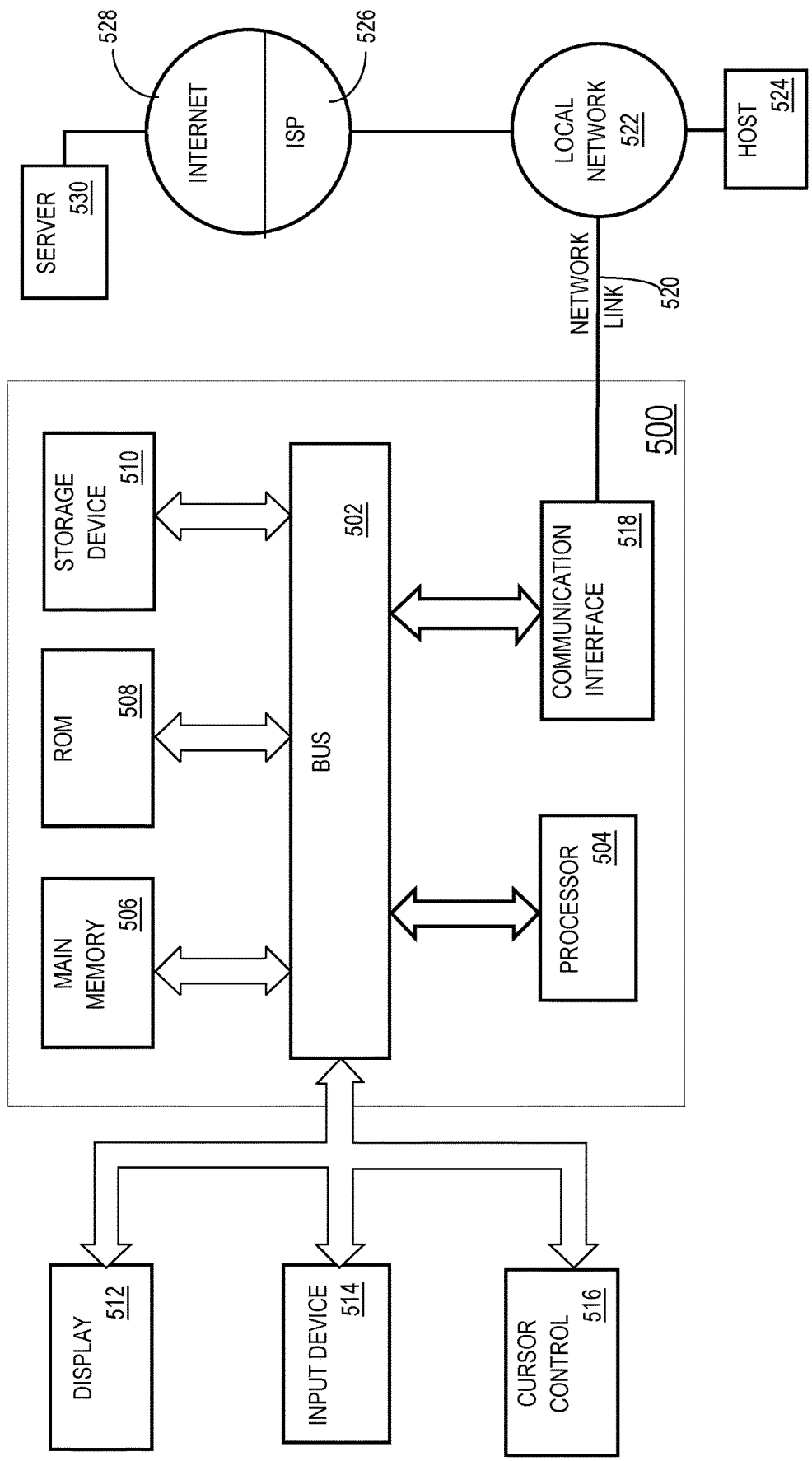
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
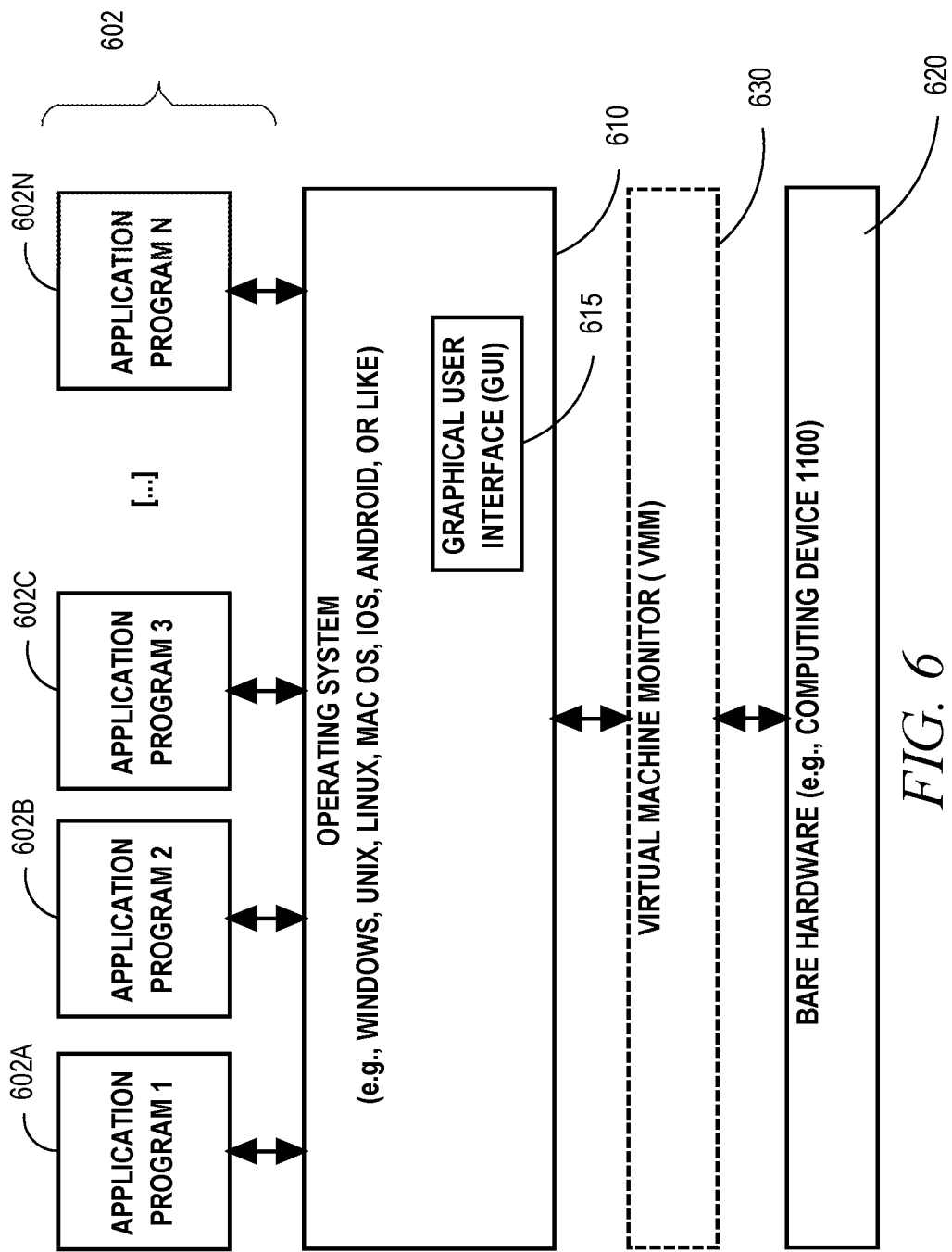
FIG. 6 is a block diagram of a basic software system that may be employed for controlling the operation of a computer system.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e. .java file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data type and to be processed by a DBMS in database statements. In general, database software of a DBMS is programmed to recognize and process native data types without configuring the DBMS to do so by, for example, defining a data type by issuing DDL statements to the DBMS.

Graph Processing Systems

A graph processing system receives graph queries, executes graph queries and returns results for the graph queries. Graph queries may comply with a graph query language, such as PGQL, GQL, Cypher, Gremlin, or SPARQL.

A graph processing system may be implemented on a computing node or a multi-node system. A graph processing system may store graph data in an in-memory form in byte-addressable memory. In-memory forms include the compressed sparse row (CSR) form and reverse CSR form. A graph processing system may persistently store graph data in a DBMS to which the graph processing system is connected. The graph data may be stored in relational tables, such as vertex tables and edge tables, or documents that store vertices and edges of a graph. Alternatively, the graph data may be persistently stored in a file system, where vertices and edges of a graph are stored in CSV files. A graph may be loaded in memory in an in-memory form to execute a graph query against the graph.

A graph processing system may be integrated into a DBMS as native functionality of the DBMS. A DBMS may define a graph and one or more vertex and edge tables and documents that store vertices and edges of the graph. A DBMS may load a graph from persistent storage into byte addressable to execute a graph query against the graph. A DBMS may also rewrite a graph query into database commands, such as SQL statements, that can be executed against vertex and edge tables that store graph data.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
creating a plurality of scouting queries, each scouting query in the plurality of scouting queries corresponding to a respective query plan in a plurality of query plans for a graph query for searching a graph, wherein each query plan in the plurality of query plans has an associated confidence value and a corresponding scouting query;
performing limited execution of the plurality of scouting queries;
determining a metric value for each scouting query in the plurality of scouting queries based on the limited execution of the scouting query;
determining a score for each query plan in the plurality of query plans based on the confidence value of the query plan and the metric value of its corresponding scouting query;
selecting a query plan based on the scores of the plurality of query plans; and
executing the graph query based on the selected query plan.

2. The method of claim 1, wherein performing limited execution of the plurality of scouting queries comprises executing each scouting query for a predetermined period of time using cancellation.

3. The method of claim 1, wherein creating the plurality of scouting queries comprises adding a clause with a random condition for each vertex variable and each edge variable such that the clause selects a random subset of vertices and a random subset of edges in the graph.

4. The method of claim 3, wherein the clause is a WHERE clause and the random condition is a function that returns a logical TRUE for the corresponding vertex variable or corresponding edge variable with a specified probability.

5. The method of claim 3, wherein performing limited execution of the plurality of scouting queries further comprises marking matches with an identifier and storing results for the matches.

6. The method of claim 1, further comprising:
responsive to the limited execution of a given scouting query traversing a percentage of vertices of the graph that is greater than a predetermined threshold, completing execution of the given scouting query.

7. The method of claim 1, further comprising:
responsive to a predicted amount of remaining time after a given scouting query being less than a time limit per scouting query times a number of remaining scouting queries, completing execution of the given scouting query.

8. The method of claim 1, wherein the metric value is a throughput value representing a number of results of the limited execution of the scouting query and determining the score for each query plan comprises calculating the score according to the following equation:

$$\text{score} = (\text{confidence} * (\text{throughput}+1)).$$

9. The method of claim 1, wherein the metric value is a number of visited vertices for each vertex match.

10. The method of claim 1, wherein:
performing limited execution of the plurality of scouting queries comprises storing scouting query results, and
executing the graph query comprises reusing the scouting query results from at least one scouting query.

11. The method of claim 10, wherein:
creating the plurality of scouting queries comprises splitting the plurality of query plans into query plan groups according to a prefix;
performing limited execution of the plurality of scouting queries comprises modifying execution of a given scouting query to avoid traversing a traversed vertex from previously executed scouting queries of the same query plan group.

12. The method of claim 10, wherein the at least one scouting query comprises at least one scouting query corresponding to a non-selected query plan.

13. The method of claim 1, wherein determining the score for each scouting query in the plurality of scouting queries comprises normalizing the metric value for each scouting query based on a computing environment in which each scouting query is executed.

14. One or more non-transitory storage media storing instructions which, when executed by one or more computing devices, cause performance of a method comprising:
creating a plurality of scouting queries, each scouting query in the plurality of scouting queries corresponding to a respective query plan in a plurality of query plans for a graph query for searching a graph, wherein each query plan in the plurality of query plans has an associated confidence value and a corresponding scouting query;
performing limited execution of the plurality of scouting queries;
determining a metric value for each scouting query in the plurality of scouting queries based on the limited execution of the scouting query;
determining a score for each query plan in the plurality of query plans based on the confidence value of the query plan and the metric value of its corresponding scouting query;
selecting a query plan based on the scores of the plurality of query plans; and
executing the graph query based on the selected query plan.

15. The one or more non-transitory storage media of claim 14, wherein performing limited execution of the plurality of scouting queries comprises executing each scouting query for a predetermined period of time using cancellation.

16. The one or more non-transitory storage media of claim 14, wherein creating the plurality of scouting queries comprises adding a clause with a random condition for each vertex variable and each edge variable such that the clause selects a random subset of vertices and a random subset of edges in the graph.

17. The one or more non-transitory storage media of claim 14, further comprising:
responsive to the limited execution of a given scouting query traversing a percentage of vertices of the graph that is greater than a predetermined threshold, completing execution of the given scouting query.

18. The one or more non-transitory storage media of claim 14, wherein the metric value is a throughput value representing a number of results of the limited execution of the scouting query and determining the score for each query plan comprises calculating the score according to the following equation:

score=(confidence * (throughput+1)).

19. The one or more non-transitory storage media of claim 14, wherein:
performing limited execution of the plurality of scouting queries comprises storing scouting query results, and
executing the graph query comprises reusing scouting query results from at least one scouting query.

20. The one or more non-transitory storage media of claim 19, wherein:
creating the plurality of scouting queries comprises splitting the plurality of query plans into query plan groups according to a prefix;
performing limited execution of the plurality of scouting queries comprises modifying execution of a given scouting query to avoid traversing a traversed vertex from previously executed scouting queries of the same query plan group.

* * * * *